(12) United States Patent
Hakkani-Tur et al.

(10) Patent No.: US 10,073,840 B2
(45) Date of Patent: Sep. 11, 2018

(54) UNSUPERVISED RELATION DETECTION MODEL TRAINING

(71) Applicant: Microsoft Technology Licensing, LLC, Redmond, WA (US)

(72) Inventors: Dilek Z. Hakkani-Tur, Los Altos, CA (US); Gokhan Tur, Los Altos, CA (US); Larry Paul Heck, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 407 days.

(21) Appl. No.: 14/136,919

(22) Filed: Dec. 20, 2013

(65) Prior Publication Data
US 2015/0178273 A1 Jun. 25, 2015

(51) Int. Cl.
*G06F 17/27* (2006.01)
*G06F 17/28* (2006.01)

(52) U.S. Cl.
CPC .................................... *G06F 17/28* (2013.01)

(58) Field of Classification Search
CPC .... G06F 17/27; G06F 17/2705; G06F 17/271; G06F 17/2715; G06F 17/274; G06F 17/2765; G06F 17/277; G06F 17/278; G06F 17/2785; G06F 17/279; G06F 17/2795
USPC .............................................. 704/9, 1, 7, 10
See application file for complete search history.

(56) References Cited

U.S. PATENT DOCUMENTS

| | | |
|---|---|---|
| 5,299,125 A | 3/1994 | Baker et al. |
| 6,246,981 B1 | 6/2001 | Papineni et al. |
| 6,311,150 B1 | 10/2001 | Ramaswamy et al. |
| 6,442,524 B1 | 8/2002 | Ecker et al. |
| 6,684,183 B1 | 1/2004 | Korall et al. |
| 7,016,829 B2 | 3/2006 | Brill et al. |
| 7,031,908 B1 | 4/2006 | Huang et al. |
| 7,177,798 B2 | 2/2007 | Hsu et al. |
| 7,328,216 B2 | 2/2008 | Hoffmann et al. |
| 7,379,596 B2 | 5/2008 | Haluptzok et al. |

(Continued)

OTHER PUBLICATIONS

Heck, et al., "Leveraging Knowledge Graphs for Web-Scale Unsupervised Semantic Parsing", In Proceedings of Interspeech, Retrieved on: Jul. 30, 2013, 5 pages.

(Continued)

*Primary Examiner* — Qi Han

(57) ABSTRACT

A relation detection model training solution. The relation detection model training solution mines freely available resources from the World Wide Web to train a relationship detection model for use during linguistic processing. The relation detection model training system searches the web for pairs of entities extracted from a knowledge graph that are connected by a specific relation. Performance is enhanced by clipping search snippets to extract patterns that connect the two entities in a dependency tree and refining the annotations of the relations according to other related entities in the knowledge graph. The relation detection model training solution scales to other domains and languages, pushing the burden from natural language semantic parsing to knowledge base population. The relation detection model training solution exhibits performance comparable to supervised solutions, which require design, collection, and manual labeling of natural language data.

18 Claims, 8 Drawing Sheets

(56) References Cited

U.S. PATENT DOCUMENTS

| | | | |
|---|---|---|---|
| 7,418,387 | B2 | 8/2008 | Mowatt et al. |
| 7,599,952 | B2 | 10/2009 | Parkinson |
| 7,747,438 | B2 | 6/2010 | Nguyen et al. |
| 7,890,326 | B2 | 2/2011 | Strope et al. |
| 7,912,702 | B2 | 3/2011 | Bennett |
| 8,024,190 | B2 | 9/2011 | Hakkani-Tur et al. |
| 8,135,578 | B2 | 3/2012 | Hebert |
| 8,352,246 | B1 | 1/2013 | Lloyd |
| 8,571,850 | B2 * | 10/2013 | Li .................. G06F 17/241 382/224 |
| 8,694,305 | B1 | 4/2014 | Grove et al. |
| 8,812,495 | B1 * | 8/2014 | Pragada ............ G06F 17/30958 707/723 |
| 8,930,180 | B1 | 1/2015 | Murray et al. |
| 2004/0148170 | A1 | 7/2004 | Acero et al. |
| 2005/0108630 | A1 | 5/2005 | Wasson et al. |
| 2005/0289124 | A1 | 12/2005 | Kaiser et al. |
| 2006/0031202 | A1 | 2/2006 | Chang et al. |
| 2006/0190253 | A1 | 8/2006 | Hakkani-Tur et al. |
| 2007/0022109 | A1 | 1/2007 | Imielinski |
| 2007/0033025 | A1 | 2/2007 | Helbing et al. |
| 2007/0198499 | A1 | 8/2007 | Ritchford |
| 2008/0133508 | A1 | 6/2008 | Jiang et al. |
| 2008/0140384 | A1 | 6/2008 | Landau |
| 2008/0221987 | A1 | 9/2008 | Sundaresan et al. |
| 2008/0288347 | A1 | 11/2008 | Sifry |
| 2009/0012842 | A1 * | 1/2009 | Srinivasan ........ G06F 17/30684 705/12 |
| 2009/0144609 | A1 | 6/2009 | Liang et al. |
| 2009/0248626 | A1 | 10/2009 | Miller |
| 2010/0023331 | A1 | 1/2010 | Duta et al. |
| 2011/0004462 | A1 | 1/2011 | Houghton et al. |
| 2011/0119050 | A1 | 5/2011 | Deschact et al. |
| 2011/0184893 | A1 | 7/2011 | Paparizos et al. |
| 2011/0307435 | A1 | 12/2011 | Overell et al. |
| 2011/0313769 | A1 | 12/2011 | Gorin et al. |
| 2012/0166183 | A1 | 6/2012 | Suendermann et al. |
| 2012/0290293 | A1 | 11/2012 | Hakkani-Tur et al. |
| 2012/0323557 | A1 | 12/2012 | Koll et al. |
| 2013/0035961 | A1 | 2/2013 | Yegnanarayanan |
| 2013/0080152 | A1 | 3/2013 | Brun et al. |
| 2013/0166303 | A1 | 6/2013 | Chang |
| 2013/0262107 | A1 | 10/2013 | Bernard |
| 2014/0046934 | A1 | 2/2014 | Zhou et al. |
| 2014/0067370 | A1 | 3/2014 | Brun |
| 2014/0067375 | A1 | 3/2014 | Wooters |
| 2014/0115001 | A1 | 4/2014 | Arroyo |
| 2014/0222422 | A1 | 8/2014 | Sarikaya et al. |
| 2014/0236570 | A1 | 8/2014 | Heck et al. |
| 2014/0236575 | A1 | 8/2014 | Tur et al. |
| 2014/0258286 | A1 | 9/2014 | Brown et al. |
| 2014/0280114 | A1 * | 9/2014 | Keysar .............. G06F 17/30864 707/730 |
| 2014/0379326 | A1 | 12/2014 | Sarikaya et al. |
| 2015/0227845 | A1 | 8/2015 | Hakkani-Tur et al. |
| 2017/0212886 | A1 | 7/2017 | Sarikaya et al. |

OTHER PUBLICATIONS

Das, et al., "Unsupervised Part-of-Speech Tagging with Bilingual Graph-Based Projections", In Proceedings of the 49th Annual Meeting of the Association for Computational Linguistics: Human Language Technologies, vol. 1, Jun. 2011, 10 pages.

Yeh, et al., "Stochastic Discourse Modeling in Spoken Dialogue Systems Using Semantic Dependency Graphs", In Proceedings of the COLING/ACL Main Conference Poster Sessions, Jul. 2006, 8 pages.

Wang, et al., "Combining Statistical and Knowledge-based Spoken Language Understanding in Conditional Models", In Proceedings of the COLING/ACL on Main Conference Poster Sessions, Jul. 2006, 8 pages.

Hassan, et al., "Unsupervised Information Extraction Approach Using Graph Mutual Reinforcement", In Proceedings of the Conference on Empirical Methods in Natural Language Processing, Jul. 2006, 8 pages.

Bechet, et al., "Unsupervised Knowledge Acquisition for Extracting Named Entities From Speech", In IEEE International Conference on Acoustics Speech and Signal Processing, Mar. 14, 2010, 4 pages.

Broder, Andrei, "A Taxonomy of Web Search", In Newsletter of ACM SIGIR Forum, vol. 36, Issue 2, Sep. 2002, 8 pages.

Lin, et al., "Active Objects: Actions for Entity-Centric Search", In Proceedings of the 21st International Conference on World Wide Web, Apr. 16, 2012, 10 pages.

Gorin, et al., "How May I Help You?", In Journal of Speech Communication—Special Issue on Interactive Voice Technology for Telecommunication Applications, vol. 23, Issue 1-2, Oct. 1997, 15 pages.

Price, P. J., "Evaluation of Spoken Language Systems: The ATIS Domain", In the Workshop on Speech and Natural Language, Jun. 1990, 5 pages.

Tur, et al., "Exploiting the Semantic Web for Unsupervised Natural Language Semantic Parsing", In Proceedings of the 13th Annual Conference of the International Speech Communication Association, Sep. 9, 2012, 4 pages.

Heck, et al., "Exploiting the Semantic Web for Unsupervised Spoken Language Understanding", In IEEE Workshop on Spoken Language Technology, Dec. 2, 2012, 6 pages.

Zettlemoyer, et al., "Online Learning of Relaxed CCG Grammars for Parsing to Logical Form", In Proceedings of the Joint Conference on Empirical Methods in Natural Language Processing and Computational Natural Language Learning, Jun. 2007, 10 pages.

McIlraith, et al., "Semantic Web Services", In Journal of IEEE Intelligent Systems, vol. 16, Issue 2, Mar. 2001, 8 pages.

Shadbolt, et al., "The Semantic Web Revisited", In Journal of IEEE Intelligent Systems, vol. 21, Issue 3, May 2006, 6 pages.

Guha, et al., "Semantic Search", In Proceedings of the 12th International Conference on World Wide Web, May 20, 2003, 10 pages.

Lenat, Douglas B., "CYC: A Large-Scale Investment in Knowledge Infrastructure", In Magazine of Communications of the ACM, vol. 38, Issue 11, Nov. 1995, 7 pages.

Krishnamurthy, et al., "Weakly Supervised Training of Semantic Parsers", In Proceedings of the Joint Conference on Empirical Methods in Natural Language Processing and Computational Natural Language Learning, Jul. 12, 2012, 12 pages.

Steedman, Mark, "Surface Structure and Interpretation", In Proceedings of Computational Linguistics, vol. 24, Issue 1, Apr. 4, 1996, 3 pages.

Petrov, et al., "Learning and Inference for Hierarchically Split PCFGs", In Proceedings of the 22nd National Conference on Artificial Intelligence, vol. 2, Jun. 22, 2007, 4 pages.

Johansson, et al., "Extended Constituent-to-Dependency Conversion for English", In Proceedings of the 16th Nordic Conference of Computational Linguistics, May 25, 2007, 8 pages.

Yarowsky, David, "Unsupervised Word Sense Disambiguation Rivaling Supervised Methods", In Proceedings of the 33rd Annual Meeting on Association for Computational Linguistics, Jun. 26, 1995, 8 pages.

Hakkani-Tur, et al., "Exploiting Query Click Logs for Utterance Domain Detection in Spoken Language Understanding", In IEEE International Conference on Acoustics, Speech and Signal Processing, May 22, 2011, 4 pages.

Hakkani-Tur, et al., "Translating Natural Language Utterances to Search Queries for SLU Domain Detection Using Query Click Logs", In IEEE International Conference on Acoustics, Speech, and Signal Processing, Mar. 2012, 4 pages.

Favre, et al., "Icsiboost", Retrieved on: Jul. 31, 2013, Available at: https://code.google.com/p/icsiboost/.

Hakkani-Tur, et al., "Using a Knowledge Graph and Query Click Logs for Unsupervised Learning of Relation Detection", In IEEE International Conference on Acoustics, Speech, and Signal Processing, May 26, 2013, 5 pages.

U.S. Appl. No. 13/169,679, Office Action dated Dec. 17, 2014, 9 pgs.

U.S. Appl. No. 13/773,269, Office Action dated Apr. 10, 2015, 28 pgs.

(56) References Cited

OTHER PUBLICATIONS

Ganchev et al., "Using Search-Logs to Improve Query Tagging", in ACL '12 Proceedings of the 50th Annual Meeting of the Association for Computational Linguistics, Short Papers, vol. 2, 2012, 5 pgs.
Hakkani-Tur et al., "Employing Web Search Query Click Logs for Multi-Domain Spoken Language Understanding", Speech Labs, Microsoft, Mountain View, CA, IEEE, 2011, 6 pgs.
U.S. Appl. No. 13/169,679, Office Action dated Apr. 17, 2015, 12 pgs.
U.S. Appl. No. 13/169,679, Office Action dated Jun. 26, 2015, 12 pgs.
Bangalore, et al., "Introduction to the Special Issue on Spoken Language Understanding in Conversational Systems", In Journal of Speech Communication, vol. 48, Issue 3, Feb. 1, 2013, 6 pages.
Celikyilmaz, et al., "Leveraging Web Query Logs to Learn User Intent via Bayesian Latent Variable Model", In Proceedings of the 28th International Conference on Machine Learning, Jun. 28, 2011, 6 pages.
Dinarelli, Marco, "Spoken Language Understanding: From Spoken Utterances to Semantic structures", In Proceedings of in Ph.D. Dissertation of DISI, University of Trento, Feb. 1, 2013, 148 pages.
Dowding, et al., "Gemini: A Natural Language System for Spoken Language Understanding", In Proceedings of the Workshop on Human Language Technology, Mar. 21, 1993, 8 pages.
Freund, Yoav, "A Decision-Theoretic Generalization of On-Line Learning and an Application to Boosting", In Proceedings of in Journal of Computer and System Sciences, 55, Aug. 1997, 21 pages.
Ge, Ruifang, "Learning Semantic Parsers Using Statistical Syntactic Parsing Techniques", In Proceedings of Artificial Intelligence Lab, Feb. 2006, 41 pages.
Goldwasser, et al., "Confidence Driven Unsupervised Semantic Parsing", In Proceedings of 49th Annual Meeting of the Association for Computational Linguistics: Human Language Technologies, vol. 1, Jun. 19, 2011, 10 pages.
Hakkani-Tur, et al., "Mining Search Query Logs for Spoken Language Understanding", In Proceedings of Workshop on Future Directions and Needs in the Spoken Dialog Community: Tools and Data, Jun. 7, 2012, 4 pages.
Hakkani-Tur, et al., "Unsupervised and Active Learning in Automatic Speech Recognition for Call Classification", In IEEE International Conference on Acoustics, Speech and Signal Processing, May 17, 2004, 4 pages.
Hillard, et al., "Learning Weighted Entity Lists from Web Click Logs for Spoken Language Understanding", In Proceedings of the Interspeech, Aug. 28, 2011, 4 pages.
Lane, Ian, et al., "Out-of-Domain Utterance Detection Using Classification Confidences of Multiple Topics", In Journal of IEEE Transactions on Audio, Speech, and Language Processing archive, vol. 15 Issue 1, Jan. 2007, 13 pages.
Icsiboost, Retrieved on: Feb. 6, 2013, Available at: http://code.google.com/icsiboost.
Kuhn, et al., "The Application of Semantic Classification Trees to Natural Language Understanding", In Proceedings of IEEE Transactions on Pattern Analysis and Machine Intelligence, vol. 17, Issue 5, May 1995, 12 pages.
Lafferty, et al., "Conditional Random Fields: Probabilistic Models for Segmenting and Labeling Sequence Data", In Proceedings of the Eighteenth International Conference on Machine Learning, Jun. 28, 2001, 8 pages.
Li, et al., "Extracting Structured Information from User Queries with Semi-Supervised Conditional Random Fields", In Proceedings of the 32nd International ACM SIGIR Conference on Research and Development in Information Retrieval, Jul. 19, 2007, 8 pages.
Liu, et al., "Lexicon Modeling for Query Understanding", In Proceedings of the IEEE International Conference on Acoustics, Speech, and Signal Processing, May 22, 2011, 4 pages.
Lowe, et al., "A Frame-Semantic Approach to Semantic Annotation", In Proceedings of ACL SIGLEX Workshop on Tagging Text with Lexical Semantics, Apr. 1997, 7 pages.

Martin, et al., "The Det Curve in Assessment of Detection Task Performance", In Proceedings of the Eurospeech, Rhodes, Greece, Sep. 1997, 4 pages.
De Mori, et al., "Spoken Language Understanding" In Proceedings of IEEE, Signal Processing Magazine, May 2008, 9 pages.
Pieraccini, et al., "A Speech Understanding System Based on Statistical Representation of Semantics", In Proceedings of IEEE International Conference on Acoustics, Speech and Signal Processing, Mar. 23, 1992, 4 pages.
Poon, et al., "Unsupervised Semantic Parsing", In Proceedings of the Conference on Empirical Methods in Natural Language Processing, vol. 1, Aug. 6, 2009, 10 pages.
Popescu, et al.,"Modern Natural Language Interfaces to Databases: Composing Statistical Parsing with Semantic Tractability", In Proceedings of 20th International Conference on Computational Linguistics, Aug. 23, 2004.
Raymond, et al., "Generative and Discriminative Algorithms for Spoken Language Understanding", In Proceedings of the Interspeech, Aug. 27, 2007, 4 pages.
Seneff, Stephanie, "TINA: A Natural Language System for Spoken Language Applications", In Proceedings of Computational Linguistics, vol. 18, Issue 1, Mar. 1992, 26 pages.
Tur, et al., "Towards Unsupervised Spoken Language Understanding: Exploiting Query Click Logs for Slot Filling", In Proceedings of: INTERSPEECH, 12th Annual Conference of the International Speech Communication Association, Aug. 28, 2011, 4 pages.
Wang, et al., "Discriminative Models for Spoken Language Understanding", In Proceedings of International Conference on Spoken Language Processing, Sep. 17, 2006, 4 pages.
Wang, et al., "Semi-Supervised Learning of Semantic Classes for Query Understanding: From the Web and for the Web", In Proceedings of the 18th ACM Conference on Information and Knowledge Management, Nov. 2, 2009, 10 pages.
Ward, et al., "Recent Improvements in the CMU Spoken Language Understanding System", In Proceedings of the Workshop on Human Language Technology, Mar. 8, 1994, 4 pages.
U.S. Appl. No. 13/773,269, Amendment and Response filed Oct. 9, 2015, 18 pgs.
U.S. Appl. No. 13/169,679, Amendment and Response dated Sep. 25, 2015, 14 pgs.
U.S. Appl. No. 13/169,679, Office Action dated Oct. 20, 2015, 13 pgs.
U.S. Appl. No. 13/773,269, Office Action dated Nov. 19, 2015, 35 pgs.
U.S. Appl. No. 13/169,679, Amendment and Response dated Feb. 22, 2016, 14 pgs.
U.S. Appl. No. 13/773,269, Amendment and Response filed Feb. 17, 2016, 15 pgs.
U.S. Appl. No. 13/773,269, Office Action dated Apr. 7, 2016, 35 pgs.
Asuncion, et al., "On Smoothing and Inference for Topic Models," In Proceedings of the Twenty-Fifth Conference on Uncertainty in Artificial Intelligence, 2009, 8 pages.
Bangalore, et al., "Towards Learning to Converse: Structuring Task-Oriented Human-Human Dialogs," In Proceedings of the IEEE International Conference on Acoustics, Speech and Signal Processing, 2006, 4 pages.
Blei, et al., "Latent Dirichlet Allocation," In Journal of Machine Learning Research, vol. 3, 2003, 30 pages.
Broder, Andrei, "A Taxonomy of Web Search," ACM SIGIR Forum, vol. 36, Issue 2, 2002, 8 pages.
Chelba, et al., "Speech Utterance Classification," In Proceedings of the IEEE International Conference on Acoustics, Speech, and Signal Processing, 2003, 4 pages.
Cheung, et al., "Sequence Clustering and Labeling for Unsupervised Query Intent Discovery," In Proceedings of the Fifth ACM International Conference on Web Search and Data Mining, Feb. 2012, 10 pages.
Chotimongkol, et al., "Automatic Concept Identification in Goal-Oriented Conversations," Carnegie Mellon University, Computer Science Department, Paper 1397, 2002, 5 pages.

(56) References Cited

OTHER PUBLICATIONS

Chu-Carroll, "Vector-based Natural Language Call Routing," In Journal of Computational Linguistics, vol. 25, Issue 3, 1999, 28 pages.

Cox, Steven, "Discriminative Techniques in Call," In Proceedings of the IEEE International Conference on Acoustics, Speech, and Signal Processing, vol. 1, 2003, 4 pages.

Fan, et al., "LIBLINEAR: A Library for Large Linear Classification," In Journal of Machine Learning Research, vol. 9, 2008, 4 pages.

Gelman, et al., "Bayesian Data Analysis," available at: «http://www.amazon.com/Bayesian-Analysis-Edition-Chapman-Statistical/dp/158488388X», Chapman and Hall/CRC publishers, 2nd Edition, 2003, Amazon.com product page only, accessed on Jul. 23, 2013, 6 pages.

Gu, et al., "Cross Domain Random Walk for Query Intent Pattern Mining from Search Engine Log," Proceedings of the IEEE11th International Conference on Data Mining, 2011, 10 pages.

Hafiner, "Optimizing SVMs for Complex Call Classification," In Proceedings of the IEEE International Conference on Acoustics, Speech, and Signal Processing, vol. 1, 2003, 4 pages.

Hakkani-Tur, Dilek, available at «http://research.microsoft.com/en-us/people/dilekha/», Employee information page listing publications, Microsoft Research, Microsoft Corporation, Redmond, WA, accessed on Jan. 23, 2014, 15 pages.

Hakkani-Tur, et al., "A Weakly-Supervised Approach for Discovering New User Intents from Search Query Logs," In Proceedings of the Annual Conference of International Speech Communication Association, Aug. 2013, 5 pages.

Hakkani-Tur, et al., "Bootstrapping Domain Detection Using Query Click Logs for New Domains," In Proceeding of the International Speech Communication Association, 2011, 4 pages.

Higashinaka, et al., "Incorporating Discourse Features into Confidence Scoring of Intention Recognition Results in Spoken Dialogue Systems," In Proceedings of the IEEE International Conference on Acoustics, Speech, and Signal Processing, 2005, 4 pages.

Lee, et al., "Unsupervised Modeling of User Actions in a Dialog Corpus," In Proceedings of the IEEE International Conference on Acoustics, Speech and Signal Processing, Mar. 2012, 4 pages.

Lee, et al., "Unsupervised Spoken Language Understanding for a Multi-Domain Dialog System," In IEEE Transactions on Audio, Speech, and Language Processing, vol. 21, Issue 11, Nov. 2013, 14 pages.

Li, et al, "Learning Query Intent from Regularized Click Graphs," In Proceedings of 31st Annual International ACM SIGIR Conference on Research and Development in Information Retrieval, 2008, 8 pages.

Li, et al., "Unsupervised Semantic Intent Discovery from Call Log Acoustics," Proceedings of the IEEE International Conference on Acoustics, Speech and Signal Processing, 2005, 4 pages.

Mintz, et al., "Distant supervision for relation extraction without labeled data," Proceedings of the Joint Conference of the 47th Annual Meeting of the AGL and the 4th International Joint Conference on Natural Language Processing of the AFNLP, 2009, 9 pages.

Natarajan, et al., "Speech Enabled Natural Language Call Routing: BBN Call Director," In Proceedings of the International Conference on Spoken Language Processing (ICSLP), 2002, 4 pages.

Pantel, et al., "Mining Entity Types from Query Logs via User Intent Modeling," In Proceedings of the 50th Annual Meeting of the Association for Computational Linguistics, vol. 1, Jul. 2012, 9 pages.

Polifroni, et al., "Using Latent Topic Features for Named Entity Extraction in Search Queries," Proceedings of the 12th Annual Conference of the International Speech Communication Association, 2011, 4 pages.

Pound, et al., "Facet Discovery for Structured Web Search: A Query-log Mining Approach," Proceedings of the ACM SIGMOD International Conference on Management of Data, 2011, 13 pages.

Radlinski, et al., "Inferring Query Intent from Reformulations and Clicks," In Proceedings of the 19th International Conference on World Wide Web, 2010, 2 pages.

Strohmaier, et al., "Acquiring Knowledge about Human Goals from Search Query Logs," In the Proceedings of the International Journal Information Processing and Management, Jan. 2012, 38 pages.

Tur et al., "Spoken Language Understanding," 2011, John Wiley & Sons, 450 pages.

Tur, et al., "Semi-Supervised Learning for Spoken Language Understanding using Semantic Role Labeling," In IEEE Workshop on Automatic Speech Recognition and Understanding, 2005, 6 pages.

Tur, et al., "Spoken Language Understanding: Systems for Extracting Semantic Information from Speech", accessible at: <<http://www.amazon.com/Spoken-Language-Understanding-Extracting-Information/dp/0470688246>>, Wiley, 1st edition, published on Apr. 25, 2011, Amazon.com product page only, retrieved on Jan. 9, 2014, 4 pages.

Tur, et al., "Towards Unsupervised Spoken Language Understanding: Exploiting Query Click Logs for Slot Filling," In Proceeding of the 12th Annual Conference of the International Speech Communication Association, 2011, 4 pages.

U.S. Appl. No. 14/180,335, Amendment and Response filed Oct. 17, 2016, 13 pgs.

U.S. Appl. No. 14/180,335, Amendment and Response filed Jul. 5, 2016, 13 pgs.

U.S. Appl. No. 14/180,335, Office Action dated May 24, 2016, 12 pgs.

U.S. Appl. No. 14/180,335, Office Action dated Aug. 31, 2016, 14 pgs.

Wallach, Hanna M., "Structured Topic Models for Language," available at «https://people.cs.umass.edu/-wallach/theses/wallach_phd_thesis.pdf», Ph.D. Dissertation, University of Cambridge, 2008, 136 pages.

Yi, et al., "Query Clustering using Click-Through Graph," In Proceedings of the 18th International Conference on World Wide Web, 2009, 2 pages.

Zhang, et al., "Extracting Phrase Patterns with Minimum Redundancy for Unsupervised Speaker Role Classification", In Proceeding of Human Language Technologies: The Annual Conference of the North American Chapter of the Association for Computational Linguistics, 2010, 4 pages.

U.S. Appl. No. 13/773,269, Amendment and Response filed Aug. 8, 2016, 18 pgs.

U.S. Appl. No. 13/769,679, Office Action dated May 26, 2016, 15 pgs.

U.S. Appl. No. 13/773,269, Amendment and Response filed Jun. 14, 2017, 14 pgs.

U.S. Appl. No. 13/773,269, Amendment and Response filed Jun. 30, 2017, 36 pgs.

U.S. Appl. No. 13/769,679, Reply Brief filed Jul. 10, 2017, 11 pgs.

Lu, et al., "A Generative Model for Parsing Natural Language to Meaning Representations", In Proceedings of the Conference on Empirical Methods in Natural Language Processing, Oct. 25, 2008, 10 pages.

PCT International Search Report and Written Opinion in International Application PCT/US2017/013584, dated May 9, 2017, 16 pgs.

U.S. Appl. No. 13/769,679, Examiner's Answer to the Appeal Brief dated May 9, 2017, 11 pgs.

U.S. Appl. No. 13/773,269, Amendment and Response filed Jan. 9, 2017, 18 pgs.

U.S. Appl. No. 13/769,679, Appeal Brief filed Jan. 25, 2017, 25 pgs.

U.S. Appl. No. 14/180,335, Office Action dated Dec. 1, 2016, 13 pgs.

JR Wen et al., "Clustering User Queries of a Search Engine", ACM World Wide Web Consortium 2010, 14 pgs.

Notice of Non-Compliant Amendment dated Nov. 9, 2016 from U.S. Appl. No. 13/773,269, 3 pgs.

Notice of Appeal filed Oct. 25, 2016 from U.S. Appl. No. 13/769,679, 2 pages.

U.S. Appl. No. 14/180,335, Amendment and Response filed Jan. 25, 2017, 12 pgs.

(56) References Cited

OTHER PUBLICATIONS

U.S. Appl. No. 13/773,269, Office Action dated Mar. 13, 2017, 40 pgs.
U.S. Appl. No. 14/180,335, Notice of Allowance dated Mar. 15, 2017, 5 pgs.
U.S. Appl. No. 14/180,335, Notice of Allowance dated Apr. 25, 2017, 2 pgs.
U.S. Appl. No. 13/773,269, Office Action dated Dec. 28, 2017, 35 pgs.
U.S. Appl. No. 14/180,335, Notice of Allowance dated Sep. 20, 2017, 5 pages.
U.S. Appl. No. 13/773,269, Amendment and Response filed Sep. 29, 2017, 13 pages.
U.S. Appl. No. 13/773,269, Amendment and Response filed Apr. 30, 2018, 18 pages.
"Non Final Office Action Issued in U.S. Appl. No. 13/773,269", dated Jun. 15, 2018, 30 Pages.

\* cited by examiner

UNSUPERVISED RELATION DETECTION MODEL TRAINING

BACKGROUND

State-of-the-art natural language understanding systems, including spoken language understanding systems, aim to automatically identify the intent of the user and extract associated arguments (i.e., slots). The output of a natural language understanding system is typically normalized and interpreted into a structured query language or an application programming interface (API). Historically, intent determination is based from call classification systems (e.g., the AT&T "How May I Help You?" system) after the success of the early commercial interactive voice response (IVR) applications used in call centers. On the other hand, the slot filling task originated mostly from non-commercial projects such as the Airline Travel Information System (ATIS) project sponsored by the Defense Advanced Research Program Agency (DARPA).

TABLE 1

A semantic template for the sample conversational input: "find me recent action movies with brad pitt"

| Intent | Slots | Entities (Values) |
| --- | --- | --- |
| Find_Movie | Release_Date | recent |
| | Genre | action |
| | Actor | brad pitt |

These semantic template-based natural language understanding systems using intent determination and slot filling tasks rely on a semantic space, usually dictated by the target application. An example utterance with a corresponding semantic template is shown in Table 1. When statistical methods are employed, in-domain training data is collected and semantically annotated for model building and evaluation. The process of manually-annotating the training data is generally time-consuming and expensive. Further, semantic template-based natural language understanding systems and corresponding training methods do not scale well to the web, other domains, and other languages.

Previous efforts have used web search queries and search query click logs with the knowledge graph to bootstrap slot filling models in natural language understanding systems. Additionally, snippets returned from web search for pairs of related entities have been used to bootstrap intent detection models in order to catch previously unseen in-domain intents in natural language understanding systems. However, such supplemental efforts merely sought to improve slot filling and intent detection by aligning the semantic space of the natural language understanding system with the knowledge graph. The semantic space developed for a specific system is likely to have some semantic inconsistency with target knowledge stores, other dialog systems, and other semantic template-based systems that complicates mapping to knowledge sources and limits interoperability between systems.

It is with respect to these and other considerations that the present invention has been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments described in the present disclosure provide a relation detection model training solution that mines freely available resources from the World Wide Web to train a relationship detection model for use during linguistic processing. The relation detection model training system searches the web for pairs of entities extracted from a knowledge graph that are connected by a specific relation. Performance is enhanced by clipping search snippets to extract patterns that connect the two entities in a dependency tree and refining the annotations of the relations according to other related entities in the knowledge graph. The relation detection model training solution scales to other domains and languages, pushing the burden from natural language semantic parsing to knowledge base population. The relation detection model training solution exhibits performance comparable to supervised solutions, which require design, collection, and manual labeling of natural language data.

Instead of attempting to align a system specific semantic space of a natural language understanding system with a domain knowledge graph, a knowledge graph-based natural language understanding system relies on the semantic space dictated by a domain knowledge graph for informational user requests and attempts to identify the knowledge graph relations invoked by such requests. The invoked relations may be used for purposes including, but not limited to, creating requests to the knowledge graph in a structured query language (e.g., SPARQL Query Language for RDF), create logical forms for natural language conversational inputs, and constraining slot filling and intent detection in natural language understanding.

Reliance on knowledge graph semantic space by a natural language understanding system is a radical departure from the state of the art and contrary to existing natural language understanding system literature; however, a knowledge graph-based natural language understanding system provides significant benefits when compared a semantic template-based system. First, the knowledge graph-based system is easier to implement. Second, the knowledge graph-based system naturally scales to the many knowledge graph domains. Third, the knowledge graph-based system naturally scales to a large number of languages. Fourth, the knowledge graph-based system enables a wide variety of unsupervised training approaches for use in natural language understanding. Fifth, by definition, the knowledge graph-based system guarantees semantic consistency with the backend information sources resulting in more direct natural language understanding interpretations.

The relation detection model training solution includes a knowledge graph defining the basic semantic ontology that serves as a source of the relations used to develop the range of intents for user conversational inputs. The system also includes the World Wide Web and the query click logs serving as sources for mining training examples guided by the relations in the knowledge graph. The link of the relation in the knowledge graph may be enhanced with a set of natural language patterns that are commonly used to refer to that relation. Such patterns can be useful to train models for various language processing tasks, such as natural or spoken language understanding.

Training examples for a relation are mined from the web by searching documents (e.g., web pages) for content containing the entities in the two nodes linked by that relation (i.e., the entity pair). The training examples are taken or derived from the document snippets returned in the search results. Additional training examples are mined from the query click logs. The query click logs contain a list of search queries associated with the uniform resource locators returned by the search query and clicked on by the user. Queries containing at least one entity from the entity pair and associated with a URL of a web page containing entities from the entity pair may be selected as training examples. The relation detection model training solution parses the training examples into natural language patterns. The training examples are then labeled with the corresponding relationship and a relation detection model is built for use in other systems such as, but not limited to, a natural language understanding system or a dialog system. In various embodiments, the relation detection model training solution may include a number of components that refine the annotations added to the training examples based on other related entities in the knowledge graph and bootstrapping.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

Figures 1, 2:
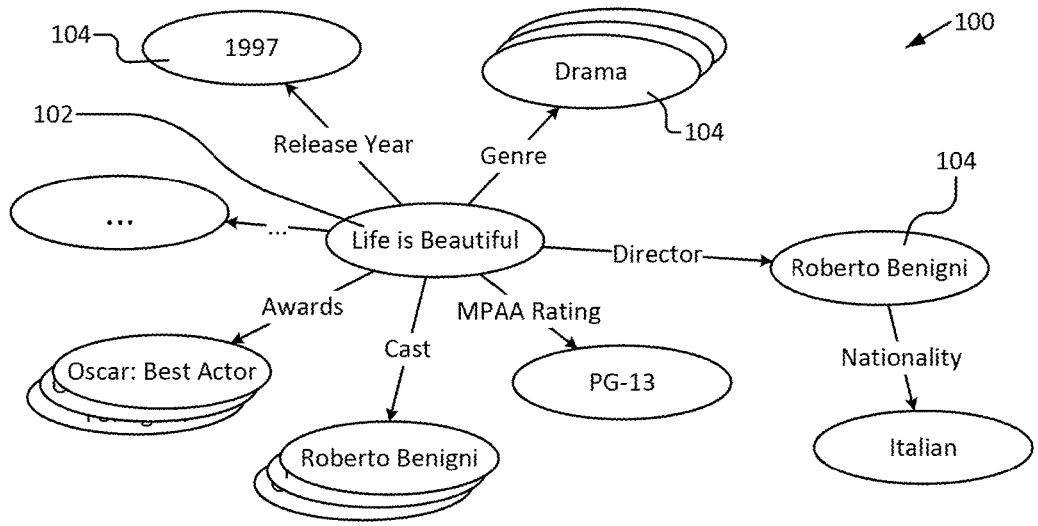
FIG. 1 graphically illustrates an example of an RDF segment pertaining to a movie.
FIG. 2 illustrates an example of relation detection based on the semantic ontology provided by a knowledge graph.

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Embodiments of a relation detection model training solution are described herein and illustrated in the accompanying figures. The relation detection model training solution mines freely available resources from the World Wide Web to train a relationship detection model for use during linguistic processing. The relation detection model training system searches the web for pairs of entities extracted from a knowledge graph that are connected by a specific relation. Performance is enhanced by clipping search snippets to extract patterns that connect the two entities in a dependency tree and refining the annotations of the relations according to other related entities in the knowledge graph. The relation detection model training solution scales to other domains and languages, pushing the burden from natural language semantic parsing to knowledge base population. The relation detection model training solution exhibits performance comparable to supervised solutions, which require design, collection, and manual labeling (i.e., annotation) of natural language data.

Knowledge graphs (i.e., knowledge bases) are triple stores built on the simple yet very powerful triple-based representation for the semantic web defined by the Resource Description Framework (RDF). A triple typically consists of two entities linked by some relation, similar to the well-known predicate/argument structure. An example of a triple is Director(Avatar, James Cameron) represented in the form of Relation(Entity 1, Entity 2). Answers to informational queries (e.g., "find the movies of a certain genre and director") are likely to be included in knowledge repositories, such as the structured semantic knowledge graphs of the emerging semantic web. One example of a suitable structured semantic knowledge graph, without limitation, is Freebase (www.freebase.com).

While no global ontology covering the entire semantic web currently exists, and one may not ever exist, the semantic web ontologies provided by schema.org, which was developed with consensus from academia and major search engine companies (e.g., Microsoft, Google, and Yahoo) and Freebase are commonly used. Such semantic web ontologies are readily and freely available for use in forming the ontology of user intents associated with informational queries.

FIG. 1 graphically illustrates an example of an RDF segment pertaining to the movie Life is Beautiful. The RDF segment 100 centers on the title node 102 for the movie Life is Beautiful. The related nodes 104 show that Life is Beautiful is a drama directed by Roberto Benigni in 1997, along with other related information. In many instances, each node contains an entity and has one or more links to the documents (e.g., web pages) from which the node is populated. This relationship is also described by the following two triples: Director(Life is Beautiful, Roberto Benigni) and Release_Date (Life is Beautiful, 1997). Such semantic ontologies are not only used by search engines, which try to semantically parse them, but may also by the authors of the in-domain web pages for knowledge bases such as, but not limited to, IMDb (www.imdb.com) and Wikipedia (www-.wikipedia.com) to obtain better visibility.

Clearly, these kinds of semantic ontologies are similar to the semantic ontologies used in goal-oriented natural dialog system. Moreover, there is a close connection between the predicate/argument relations in the knowledge graphs and the intents used in goal-oriented natural dialog systems. For example, the nodes of the knowledge graph correspond to the slots in the semantic ontology of a conventional natural language understanding system and the edges indicate relations (i.e., undirected intents).

Instead of attempting to align a system specific semantic space of a natural language understanding system with a domain knowledge graph, a knowledge graph-based natural language understanding system relies on the semantic space dictated by a domain knowledge graph for informational user requests and attempts to identify the knowledge graph relations invoked by such requests. The invoked relations may be used for purposes including, but not limited to, creating requests to the knowledge graph in a structured query language (e.g., SPARQL Query Language for RDF), create logical forms for natural language conversational inputs, and constraining slot filling and intent detection in natural language understanding.

Reliance on knowledge graph semantic space by a natural language understanding system is a radical departure from the state of the art and contrary to existing natural language understanding system literature; however, a knowledge graph-based natural language understanding system provides significant benefits when compared a semantic template-based system. First, the knowledge graph-based system is easier to implement. Second, the knowledge graph-based system naturally scales to the many knowledge graph domains. Third, the knowledge graph-based system naturally scales to a large number of languages. Fourth, the knowledge graph-based system enables a wide variety of unsupervised training approaches for use in natural language understanding. Fifth, by definition, the knowledge graph-based system guarantees semantic consistency with the backend information sources resulting in more direct natural language understanding interpretations.

FIG. 2 illustrates an example of relation detection based on the semantic ontology provided by a knowledge graph. Relation detection aims to determine with relations in the part of knowledge graph related to the conversational input domain has been invoked in the user conversational inputs. The example shows two sample conversational inputs. The first conversational input 202a seeks information about movies by Roberto Benigni, the director. The second conversational input 202b seeks to identify the director of "Life is Beautiful," a specific movie. Both conversational inputs invoke the Director relation in the knowledge graph, but from different starting points as represented by the different graphical representations of the Director triple store 204a, 204b.

Simplified versions of the queries 206a, 206b to the backend knowledge base for both conversational inputs are shown in a query language format. Both queries include the Director relation, but the queries requesting opposite entities connected by the Director relation. This illustrates the need to detect the relation being invoked in the conversational input to formulate the query to the backend. Formulation of the complete query to the backend knowledge base requires detection of the invoked entities in the conversational input and the invoked knowledge graph relations. In some embodiments, detection of the invoked entities in the conversational input and detection of the invoked graph relations are two separate tasks. In other embodiments, detection of the invoked entities in the conversational input and detection of the invoked graph relations are parts of a single task. Logical representations 208a, 208b of the queries formally illustrate the centrally of the Director relation to the retrieving the information requested by both conversational inputs.

Figure 3:
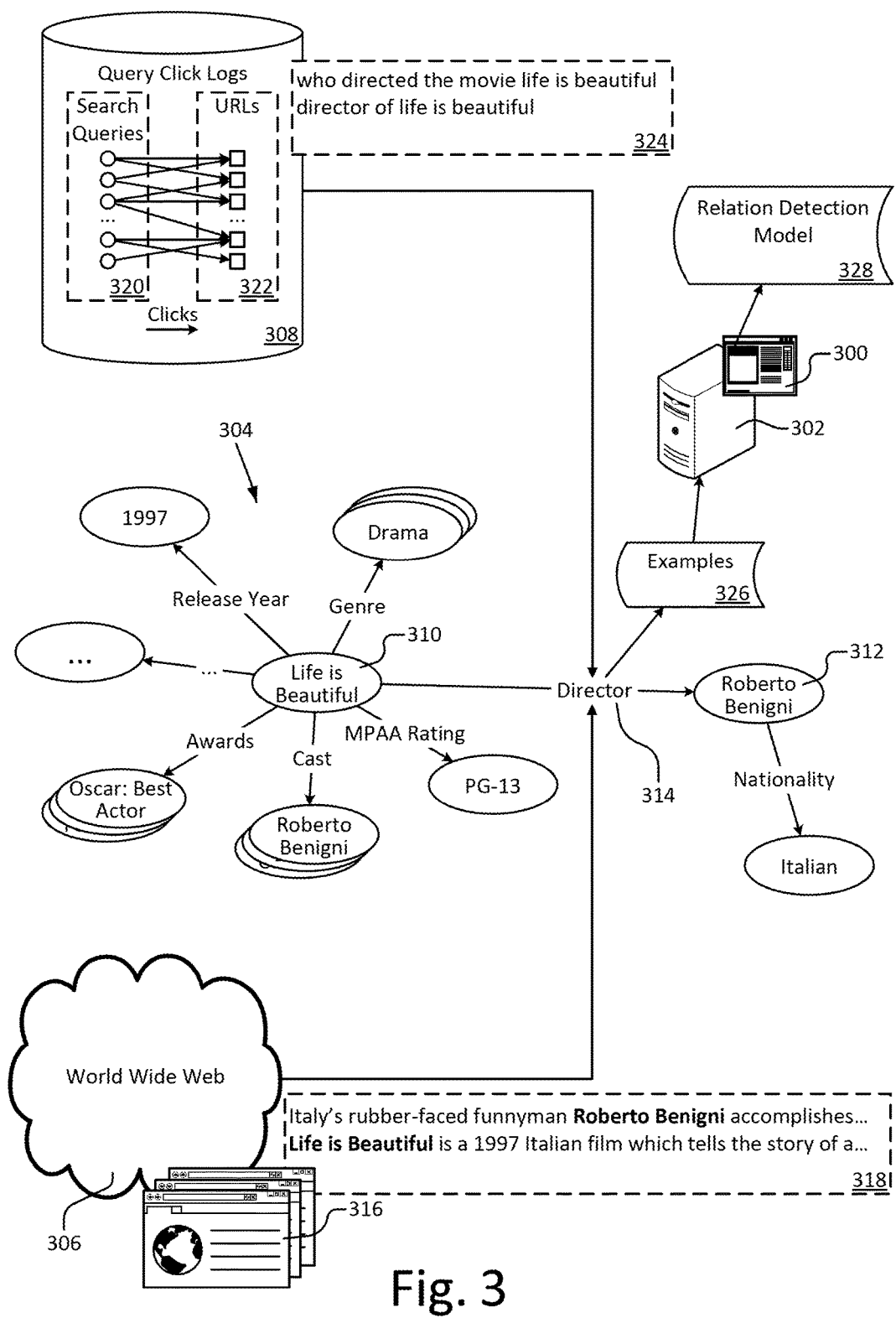
FIG. 3 graphically illustrates one example of a system suitable for use with the relation detection model training solution.

FIG. 3 graphically illustrates one example of a system suitable for use with the relation detection model training solution. The relation detection model training solution includes an application 300 executed on a computing device 302. The system includes the knowledge graph 304 defining the basic semantic ontology that serves as a source of the relations used to develop the range of intents for user conversational inputs. The system also includes the World Wide Web 306 and the query click logs 308 serving as sources for mining training examples guided by the relations in the knowledge graph. As before, the knowledge base includes the triple Director(Life is Beautiful, Roberto Benigni) formed by the movie title node 310, the director name node 312, and the Director relation 314 between the two nodes. The link of the relation in the knowledge graph may be enhanced with a set of natural language patterns that are commonly used to refer to that relation. Such patterns can be useful to train models for various language processing tasks, such as natural or spoken language understanding.

Training examples for a relation are mined from the web by searching documents 316 (e.g., web pages) for content containing the entities in the two nodes linked by that relation (i.e., the entity pair). The training examples are taken or derived from the document snippets 318 returned in the search results. Additional training examples are mined from the query click logs. The query click logs contain a list of search queries 320 associated with the uniform resource locators (URLs) 322 returned by the search query and clicked on by the user. Queries 324 containing at least one entity from the entity pair and associated with a URL of a web page containing entities from the entity pair may be selected as training examples.

The relation detection model training solution parses the training examples 326 into natural language patterns. The training examples are then labeled with the corresponding relationship and a relation detection model 328 is built for use in other systems such as, but not limited to, a natural language understanding system or a dialog system. In various embodiments, the relation detection model training solution may include a number of components that refine the annotations added to the training examples based on other related entities in the knowledge graph and bootstrapping.

As the ontologies of the semantic web can be used to bootstrap ontologies for dialog system applications, one can also use the populated knowledge in the graph to mine examples that include surface forms of entities and their relations in natural language. For example, for a pair of related entities, one can enhance the link of the relation in the knowledge graph with a set of natural language patterns that are commonly used to refer to that relation. Such patterns can be useful to train models for various language processing tasks, such as spoken language understanding (SLU).

Figure 4:
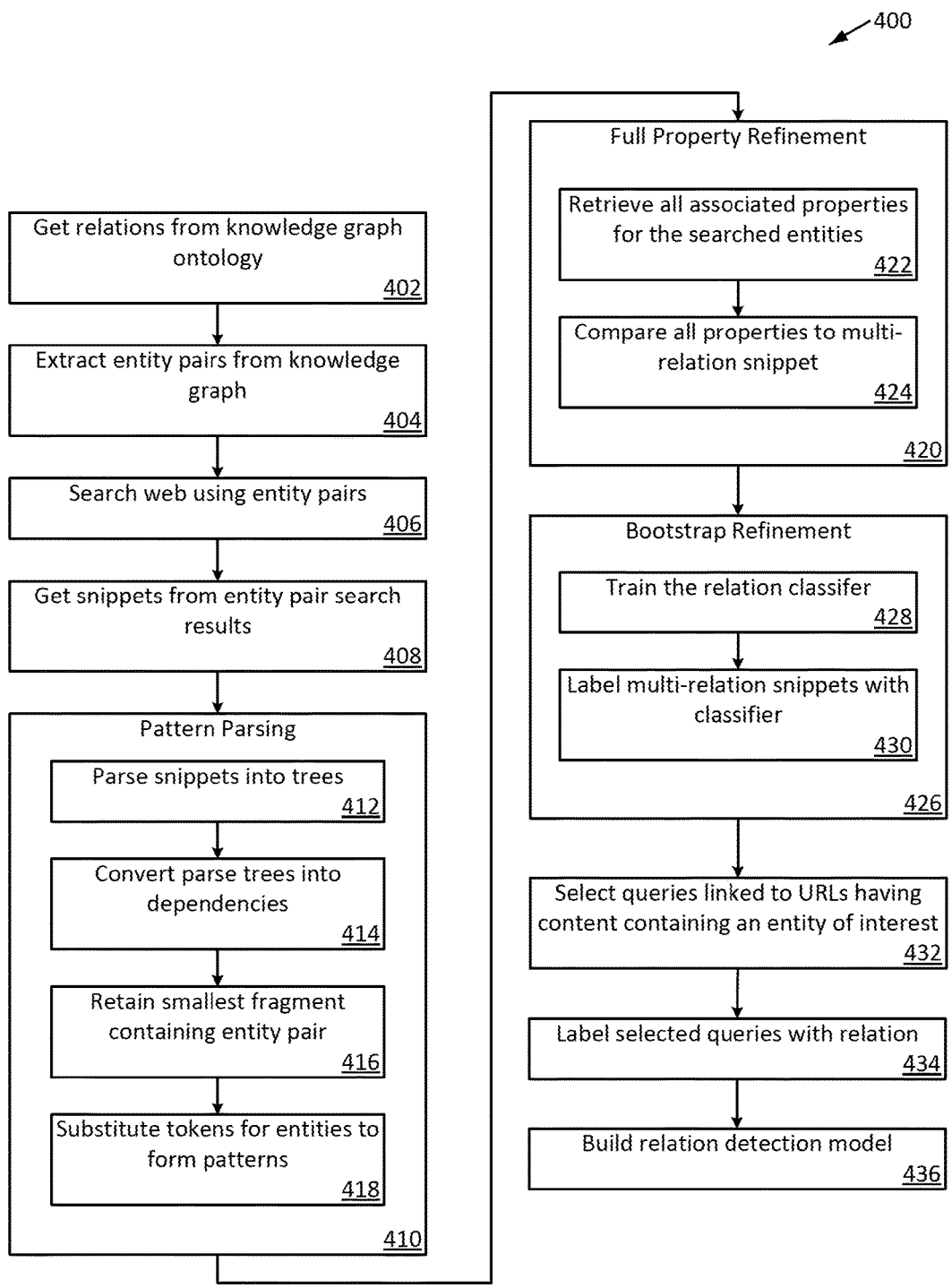
FIG. 4 is a high-level flowchart of one embodiment of the relation detection model training method used by the relation detection model training solution.
Figure 5:
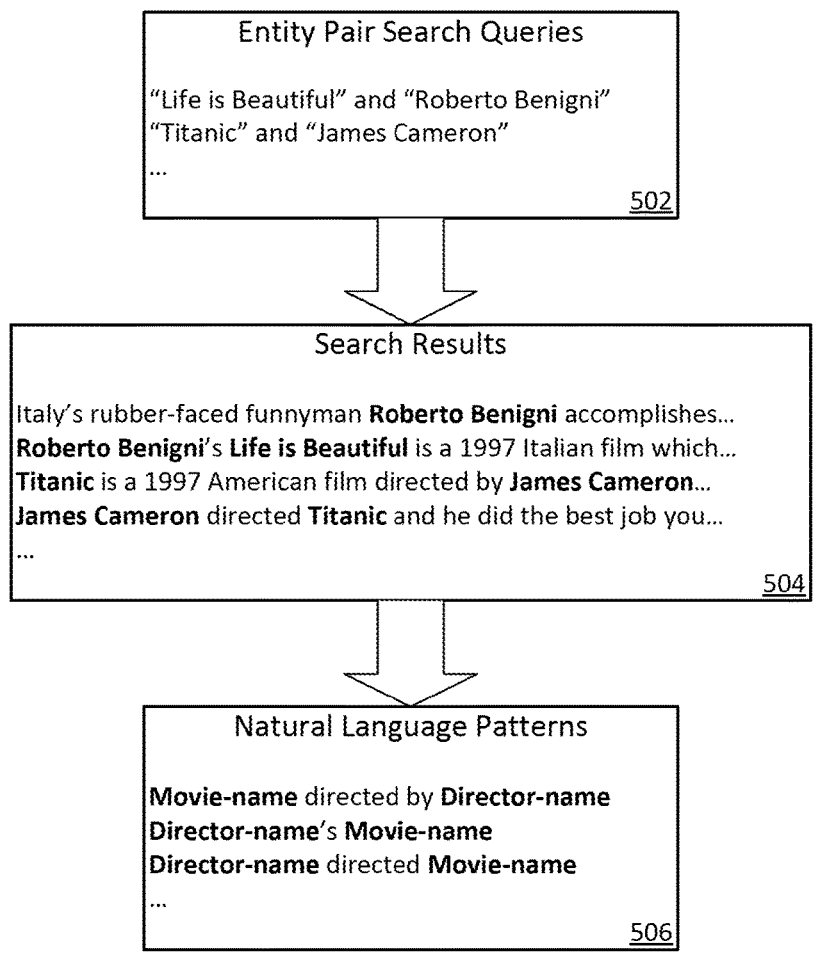
FIG. 5 is flow diagram illustrating one embodiment of the data flow during the bootstrapping portion of the relation detection model training method.

FIG. 4 is a high-level flowchart of one embodiment of the relation detection model training method used by the relation detection model training solution. The relation detection model training method 400 is an unsupervised training method that exploits the semantic knowledge graphs of the semantic web to train a relation detection model without the design, collection, and manual annotation of natural language data required by supervised solutions. FIG. 5 is flow diagram illustrating one embodiment of the data flow during portions of the relation detection model training method.

The relation detection model training method begins with an identify relations operation 402 that identifies the relations between nodes (i.e., entities) in the domain knowledge graph based on the defined schema (i.e., ontology) associated with the knowledge graph.

Next, an entity pair extraction operation 404 extracts all possible entity pairs in a given domain that are connected with a relation from the knowledge graph. Embodiments of the relation detection model training method operate on each relation separately. In other words, all possible entity pairs connected with a specific relation may be extracted from the knowledge graph and processed into annotated training data before moving on to the next relation in the knowledge graph. Extracting each entity pair connected by a relation provides the maximum amount of training examples for use in training the relation detection model; however, fewer than all possible entity pairs may be extracted for further processing.

Some embodiments may iteratively extract and process a portion of all possible entity pairs for a selected relation until a threshold amount of training data is obtained. For example, the entity pairs may be extracted in groups of 1,000 and processed until 8,000 training examples are collected. The first 1,000 entity pairs for a first relation may correspond to popular entities and produce more than 8,000 training examples. The first 1,000 entity pairs for a second relation may only produce 3,000 training examples. Accordingly, additional group of 1,000 entity pairs would be collected for the second relation until the total number of training examples exceeds 8,000 or all possible entity pairs for that relation have been extracted.

An entity pair search operation 406 uses the extracted entity pairs to mine patterns used in natural language realization of the relation by performing a search the general content of the web and/or a domain specific knowledge store, such as a backend knowledge base. In other words, the entity pairs are used to create a web query. In some embodiments, the query may include the relation. In various embodiments, the query may include variations of (e.g., synonyms or misspellings) the search terms. Examples of the entity pair search queries 502 are shown in FIG. 5.

A snippet gathering operation 408 collects the snippets from documents that are returned by the entity pair search and contain both entities from the entity pair. Examples of the snippets 504 from the document returned by the entity pair search queries are shown in FIG. 5. The snippets returned by the search engine are ultimately used to create natural language examples serving as the training data for each relation. Assume $S_{ab}$ is the set of all snippets returned for the pair of entities a and b by a web search. As a practical matter, only some of the set $S_{ab}$ is used. The subset of selected snippets that include both entities is defined as $$M_{ab}\{s:s \in S_{ab} \wedge \text{includes}(s,a) \wedge \text{includes}(s,b)\}, \quad (1)$$

where includes(x,y) is a binary function that has a value of 1 if string x contains y as a substring. In various embodiments, the full text of all snippets for each relation may be used as training examples. Because the snippets may be lengthy and contain irrelevant information, some embodiments extract at least some of the more relevant portions or remove at least some irrelevant portions from the returned snippets.

At a minimum, a snippet must include both entities regardless of whether full or clipped snippets are used. Snippets containing both entities are labeled with the relation. A snippet that does not include both entities has no potential to invoke the relation between the entities or to be otherwise useful in further refining the annotations. Accordingly, single entity snippets are discarded or ignored.

Figure 6:
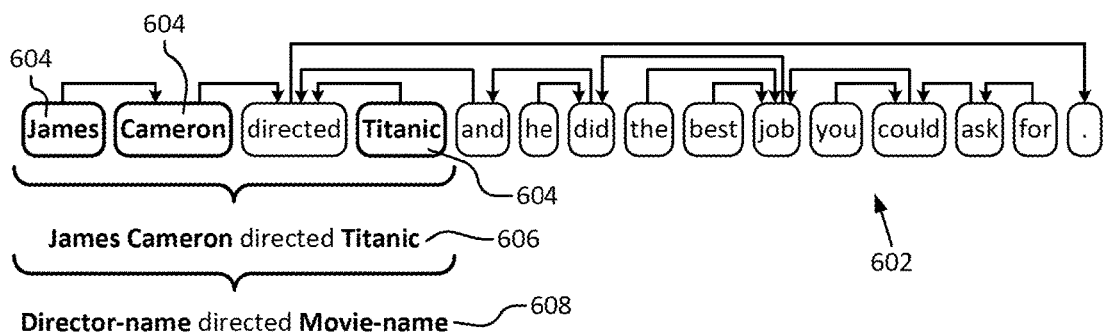
FIG. 6 graphically illustrates the one embodiment of the pattern parsing operation.

A pattern parsing operation 410 parses the snippets into natural language patterns. The pattern parsing operation discards (i.e., clips) irrelevant parts of the snippets while keeping the words that realize the relation from the snippet. FIG. 6 graphically illustrates one embodiment of the pattern parse for a sample snippet returned from the entity pair search.

An initial parsing operation 412 that parses the returned snippets into parse trees using a natural language parser. One example of a suitable natural language parser is the Berkeley Parser, a state-of-the-art parser trained from a treebank following a latent variable approach by iteratively splitting non-terminals. The snippet is semantically parsed and the relevant constitute elements such as, but not limited to, the words from the entity pair are located. The snippet initially parsed snippet 602 returned from the entity pair a search based on the Director(Titanic, James Cameron) triple with the separate constitute elements isolated in separate boxes is shown in FIG. 6.

A dependency conversion operation 414 converts the parse trees into dependency trees. In some embodiments, the dependency conversion operation is accomplished using a treebank convertor. An example of a suitable treebank converter is the LTH Constituency-to-Dependency Conversion Tool. The semantic relationships between the constitute elements are represented by arrows in the parsed snippet of FIG. 6.

A snippet fragment selection operation 416 retains the word sequence from the smallest dependency sub-tree that includes both related entities. The constitute elements of interest 604 (i.e., the entities from the word pair: "James Cameron," and "Titanic") are emphasized in the parsed snippet of FIG. 6. The phrase "James Cameron directed Titanic" is extracted as a natural language expression 606 of the entity specific triple.

From the knowledge graph, the tokens (i.e., node tags) corresponding to the entities are known. A candidate pattern creation operation 418 substitutes the tokens for the corresponding entities in the natural language expression to form natural language patterns that realize the relation for use in training the relation detection model. Examples of the natural language patterns 506 parsed from the snippets are shown in FIG. 5. A candidate pattern 608 substituting the tokens (i.e., "Director-name" and "Movie-name") from the Director(Director-name, Movie-name) triple for the corresponding entities (i.e., "James Cameron" and "Titanic") is shown in FIG. 6. The relevant constituent entities may include the relation or its derivatives and any words supporting or modifying the entity pair or relation words. However, valid patterns may exist that do not include the relation word or a derivative thereof. For example the phrase "James Cameron's Titanic" forms the pattern Director-name's Movie-name. Conversely, the relation may be used to discard a possible, but inaccurate, natural language expression. For example, Roberto Benigni both directed and starred in Life is Beautiful. Thus, the phrase "Roberto Benigni starred in Life is Beautiful" describes a valid relation (i.e., the Star relation) between the two entities, but it not a proper natural language expression for the Director relation. Some embodiments use additional information, such as the search queries linked to the URL of the web page that provided the snippet to filter out generally valid natural language expressions that do not correspond to the relation being processed.

Some snippets may invoke more than one relation because some entities are connected with more than one relation, and some entities are related to other entities as well. For example, the snippet "A Florida Enchantment is a silent film directed by and starring Sidney Drew" is mined as a training example for the Director relation, but it includes the movie Cast and Genre relations as well. This is because A Florida Enchantment is connected to Sidney Drew by more than one relation (i.e., Director and Cast), and the movie is linked to a genre, which is also invoked in this example. Accordingly, some embodiments refine the annotations for snippets invoking more than one relation (i.e., multi-relation snippets).

A full property refinement operation 420 implements one of two algorithms used to refine the annotations of multi-relation snippets. The property retrieval operation 422 retrieves all associated properties (i.e., relations and entities) for the searched entity from the knowledge base. Using the RDF segment from FIG. 1 as an example, the resulting property list includes "Roberto Benigni" as Cast, "Drama" as Genre, "1997" as Release Year, and "Oscar, Best actor" as "Award." A property comparison operation 424 compares the properties from the list are then searched against the multi-relation snippets. If a match is found, the multi-relation snippet is labeled with the matching relation.

A bootstrap refinement operation 426 implements the second algorithms used to refine the annotations of multi-relation snippets. A classifier training operation 428 trains a relation classifier with the mined data and their annotations. In a classifier labeling operation 430, the relation classifier is used to label the multi-relation snippets with additional relations. Only relations r with a high probability of appearance in the conversational input a are included, which optimizes a threshold t for finding the relation r with the probability of being the most probable relation given the conversational input P(r|u) according to the classifier on a development data set. The bootstrap refinement operation may be iteratively performed to find more relations in multi-relation snippets.

In various embodiments, the full property and/or bootstrap refinement operations are only used if multi-relation snippets are identified. In some embodiments, only multi-relation snippets undergo the full property and/or bootstrap refinement operation. In other embodiments, the full property and/or bootstrap refinement operation is applied to all snippets.

In addition to patterns mined from search results, the training data is enriched by extracting queries linked to the URLs of web pages that contain the entity pairs. Large-scale search engines log more than 100,000,000 queries per day. Each query in the query click log has an associated set of URLs returned by the query that were clicked by the user. A high relevance query identification operation 432 identifies queries that are closely related to the contents of documents associated with URLs clicked on (i.e., visited) by the user performing the search. The high relevance query identification operation examines the URLs of the snippets that contain the two entities that appear in the search results for the related entity pairs $M_{ab}$ to identify and selects related queries. Related queries are the queries associated with one or more URLs from the set of URLs $U_{ab}$ that include the snippets in $M_{ab}$. In various embodiments, queries that do not include at least one of the entities of interest are ineligible for selection (e.g., discarded).

The number of queries selected during the link-based query matching operation may be limited. As a practical matter, there is a limit to the meaningful variations likely to be exhibited among eligible queries. Limiting the number of queries selected provides a mechanism that may reduce the amount of effectively redundant data that is processed. Similarly, there may be a large number of infrequently occurring queries that may be reasonable ignored when building the relation detection model without a statistically significant impact. Accordingly, some embodiments rank the queries in order of frequency and select a limited number of the highest ranking queries. In some embodiments, the number of queries selected may be limited per URL. Limiting the queries selected per URL may result in greater query diversity while reasonably limiting the queries that are processed to a reasonable number. For example, some embodiments select only the 10 most frequent queries associated with each URL.

In various embodiments, the selected queries selected as training examples may be parsed in to patterns using a pattern parsing operation such as, but not limited to, the pattern parsing operation described herein.

A query annotation operation 434 labels the selected queries from the link-based query matching operation with the relation to use as training examples for the relation detection model. Once the training examples of the desired types are collected and labeled, a model building operation 436 builds a statistical relation detection model from the labeled training data. The training data may include any or all of the snippets (full or clipped), queries, and patterns extracted from the snippets and/or queries. The relation detection model may include combinations of different types of training data and/or the results obtained using previously-trained relation detection models. The training data may be extended with additional annotations using one or more iterations of bootstrap refinement. Because each conversational input can invoke more than one relation, relation detection may be considered a multi-class, multi-label classification problem and a classifier is used to train the relation detection model from the labeled training data using word unigrams, bigrams and trigrams as features. Examples of suitable training engines include, but are not limited to, icsiboost, and Boostexter, and Adaboost. The relation detection model may also be trained using one or more models originally trained using the training data.

TABLE 2

System performance (F-measure)

| Model | Micro-F (%) | Targeted Macro-F (%) |
|---|---|---|
| Majority Class | 20.3 | 4.2 |
| Full Snippets | 42.5 | 55.1 |
| Patterns from Snippets | 44.1 | 58.0 |
| Patterns from Snippets (1 iteration) | 45.2 | 59.6 |
| Search Queries | 31.6 | 40.6 |
| Search Queries (1 iteration) | 34.7 | 43.2 |
| Combination (upper bound) | 50.2 | 62.7 |
| Combination (weighted voting) | 45.5 | 59.9 |
| Supervised | 47.6 | 59.3 |

Table 2 compares the performance of relation detection models trained using various embodiments of the relation detection model training solution to each other and to a relation detection model trained using a supervised solution. The embodiments of the relation detection model training solution used only patterns mined in an unsupervised way from web search and query logs. The patterns were mined for seven entity pairs from the knowledge graph relating to movie search. The relations for the seven entity pairs used for the performance evaluation were Director, Star, Release Date, Language, Genre, Country, and MPAA Rating. Snippets related to each of the seven entity pairs were extracted from web search results and filtered to include only the snippets that include both entities. After final cleanup, the resulting training data set contained approximately 178,000 patterns. A number of unsupervised models, described below, were trained using the training data set with various embodiments of the relation detection model training solution. The Supervised model was trained using 2,334 patterns manually-labeled with one of the seven relations.

A development data set was used to tune the thresholds for F-measure computation contains 1,200 conversational inputs of 20 relations. Some of the 20 relations, such as movie reviews and duration, were not included in the data mined from the knowledge graph. Some of the conversational inputs were transactional (e.g., "play trailer") rather than informational. One of the seven relations mined from the knowledge graph appeared in 66% of the conversational inputs from the development data set. The relative performance was measured against a blind test set containing 1,200 conversational inputs, 64% of which included one of the seven relations mined from the knowledge graph.

The relative performance is shown for a macro-averaged F-measure of the seven relations for which data was mined (Targeted Macro-F) and the relation detection F-measure when all 20 categories in the data set are considered (Micro-F). The Majority Class model provided one baseline and representing the case where labeled training data is not available. In the Majority Class model, all conversational inputs were assigned to the majority relation (i.e., the Director relation for the development data set).

The unsupervised relation detection models include the Full Snippet, Patterns from Snippet, Search Queries, and Combination models. The Full Snippet model used n-grams of the complete snippet sequence (i.e., the full $M_{ab}$ set) from the URLs mined from the query click logs and offers a second baseline from which to measure performance of more sophisticated models. The Patterns from Snippet models contained the snippets clipped using dependency parses. The Search Queries models used only the search queries from the query quick logs. Models including the "1 iteration" designation used a single iteration of the bootstrap algorithm to refine and extend the labels of training examples. In other words, the training set is labeled with first model and then re-trained. Further iterations of the bootstrap algorithm are not reported, as they did not result in any improvement on the development set after the first pass.

The Combination models combined the estimation of the Patterns from Snippets (1 iteration) model and the Search Queries (1 iteration) model. The "upper bound" designation refers to using the correct relation found by either model and is a special case intended to show room for improvement. "The weighted voting" designation refers to interpolating the decisions from the two models with weights optimized on the development data set (i.e., interpolating class posteriors).

As shown in Table 2, the relation detection models trained using any embodiment of the relation detection model training solution produced significantly better F-measure results (both micro and macro) than the Majority Class model. Refining the annotations with a single iteration of the bootstrapping algorithm improved the underlying model. The least improvement occurred when using search queries by themselves (i.e., without snippets), even after applying the bootstrapping algorithm. One reason for the lower performance of search queries relative to snippets may be due to the fact that search queries often only include the entities or exclude function words that modify or give context to the relation. The best unsupervised relation detection model in this evaluation proved to be the Combination (weighted-voting) model, which is bolded in Table 2; however, the performance of several other unsupervised relation detection models did not lag far behind. While the Supervised model has a better micro F-measure when compared to the top unsupervised relation detection models, the parity of the macro F-measures shows that unsupervised relation detection models perform at or near the level obtained from supervised training.

A relation detection model training solution has been shown and described. The relation detection model training solution uses freely available resources and naturally aligns semantic parsing and interpretation with the target knowledge graph. The relation detection model may be built around pivot entities (e.g., a movie name) and the corresponding relations. The relation detection model training solution scales to other domains and languages, pushing the burden from natural language semantic parsing to knowledge base population, which can be achieved using available structured knowledge sources. Any in-domain data can further be exploited for better performance using supervised or unsupervised adaptation methods.

The present invention is applicable to a wide variety of dialog system modalities, both input and output, capable of responding to conversational inputs such as, but not limited to, speech, writing (e.g., text or handwriting), touch, gesture, and combinations thereof (e.g., multi-mode systems). Embodiments describing a modality-specific dialog system (e.g., a spoken dialog system) are merely illustrative of one suitable implementation and should not be construed as limiting the scope to and particularly modality or modalities and should be read broadly to encompass other modalities along with the corresponding hardware and/or software modifications to implement such modalities.

The subject matter of this application may be practiced in a variety of embodiments as systems, devices, and other articles of manufacture or as methods. Embodiments may be implemented as hardware, software, computer readable media, or a combination thereof. The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
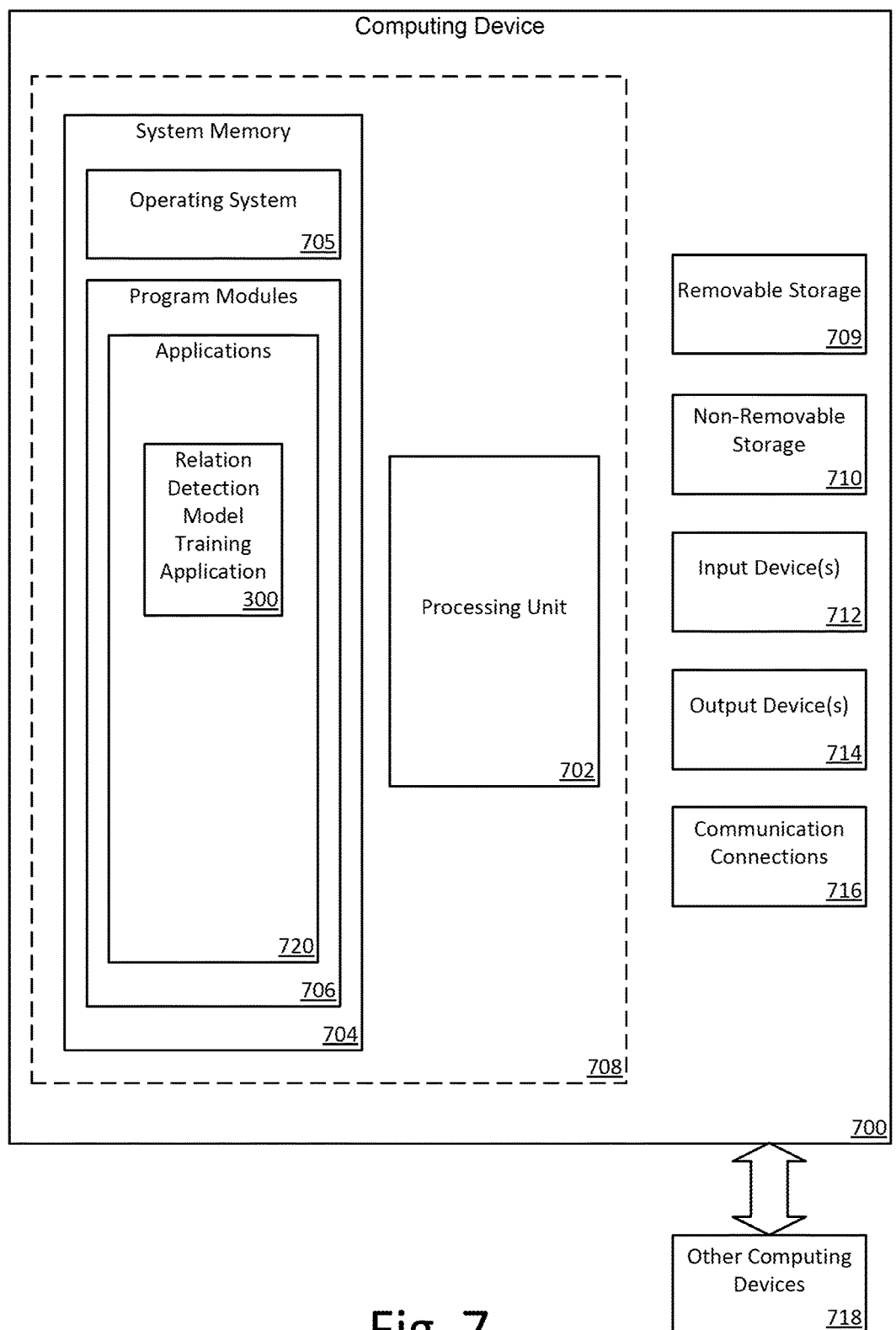
FIG. 7 is a block diagram illustrating one embodiment of the physical components of a computing device with which embodiments of the invention may be practiced.

FIGS. 7 and 8 and the associated descriptions provide a discussion of a variety of operating environments in which embodiments of the invention may be practiced. However, the devices and systems illustrated and discussed are for purposes of example and illustration and are not limiting of a vast number of computing device configurations that may be utilized for practicing embodiments of the invention described above.

FIG. 7 is a block diagram illustrating physical components (i.e., hardware) of a computing device 700 with which embodiments of the invention may be practiced. The computing device components described below may be suitable for embodying computing devices including, but not limited to, a personal computer, a tablet computer, a surface computer, and a smart phone, or any other computing device discussed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as the unsupervised relation detection training application 300. For example, the operating system 705 may be suitable for controlling the operation of the computing device 700. Furthermore, embodiments of the invention may be practiced in conjunction with a graphics library, other operating systems, or any other application program and is not limited to any particular application or system. This basic configuration is illustrated by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated by a removable storage device 709 and a non-removable storage device 710.

As stated above, a number of program modules and data files may be stored in the system memory 704. While executing on the processing unit 702, the software applications 720 may perform processes including, but not limited to, one or more of the stages of the relation detection model training method 400. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the illustrated components may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein with respect to the software applications 720 may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all examples of computer storage media (i.e., memory storage.) Computer storage media may include random access memory (RAM), read only memory (ROM), electrically erasable read-only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700.

Figure 8A:
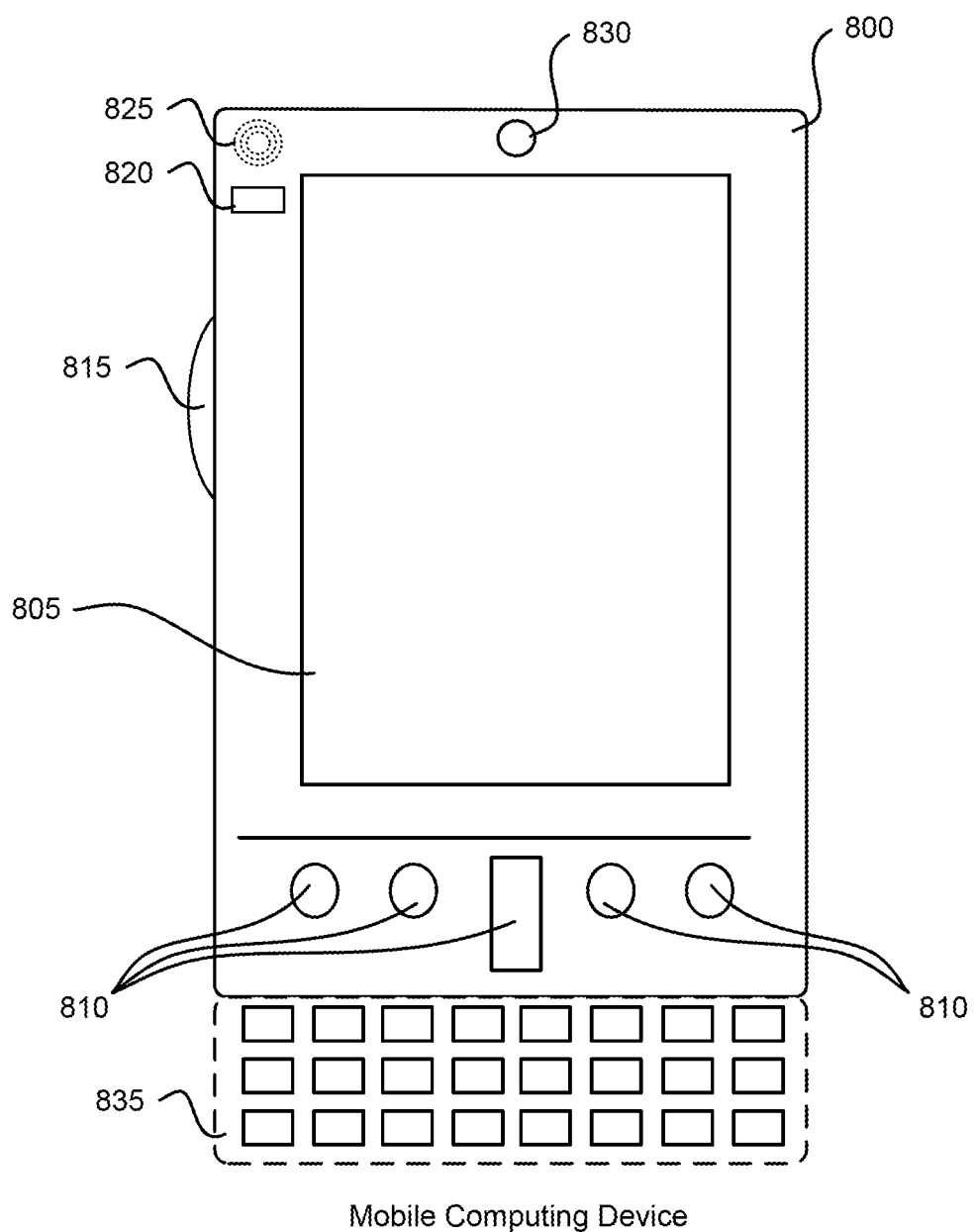
FIGS. 8A and 8B are simplified block diagrams of a mobile computing device with which embodiments of the present invention may be practiced.
Figure 8B:
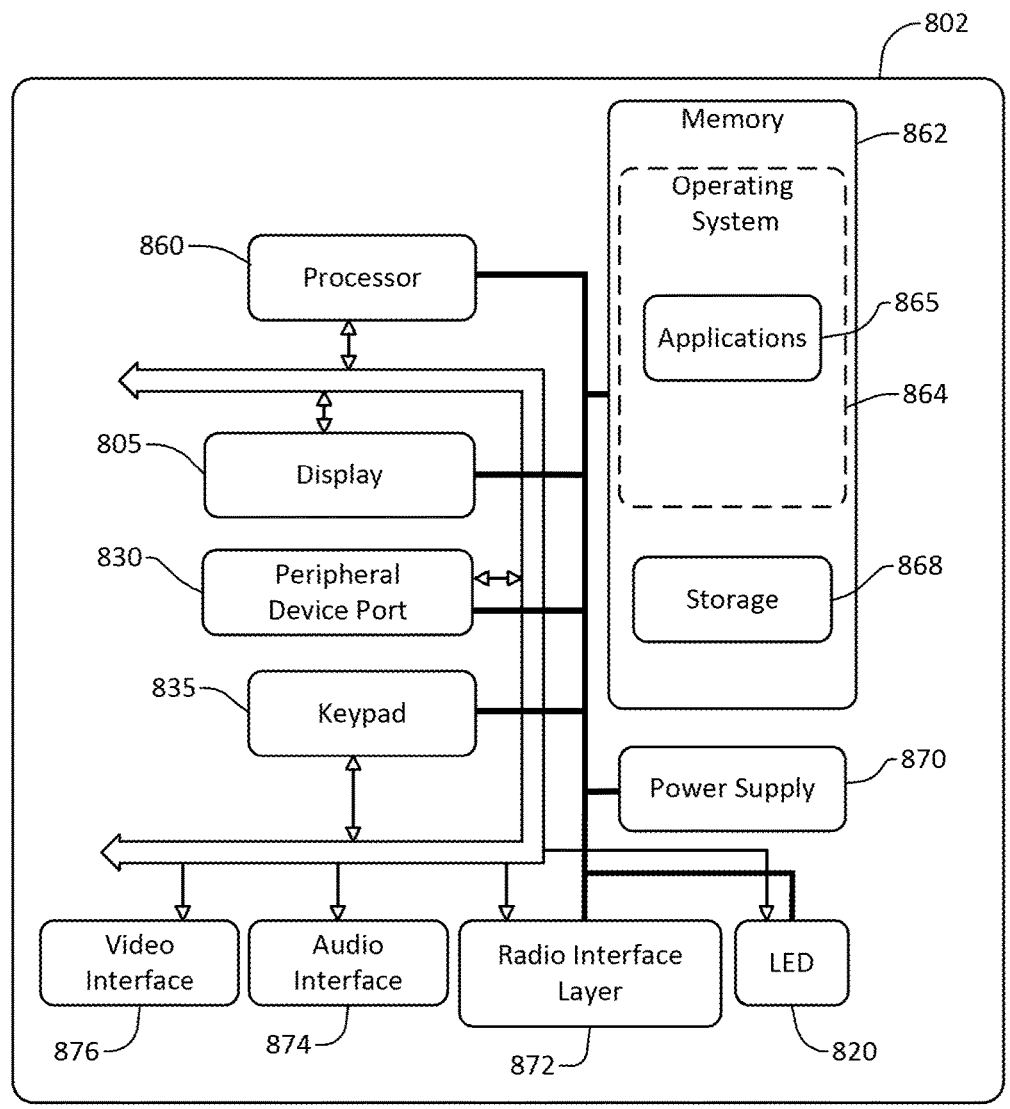

FIGS. 8A and 8B illustrate a mobile computing device 800 with which embodiments of the invention may be practiced. Examples of suitable mobile computing devices include, but are not limited to, a mobile telephone, a smart phone, a tablet computer, a surface computer, and a laptop computer. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface, a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a smart phone capable of running one or more applications (e.g., browsers, e-mail clients, notes, contact managers, messaging clients, games, and media clients/players). In some embodiments, the system 802 is integrated as a computing device, such as an integrated personal digital assistant (PDA) and wireless phone.

One or more application programs 865 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 865 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including software applications 720 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the outside world via a communications carrier or service provider. Transmissions to and from the radio 872 are conducted under control of the operating system 864. In other words, communications received by the radio 872 may be disseminated to the application programs 865 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

Figure 9:
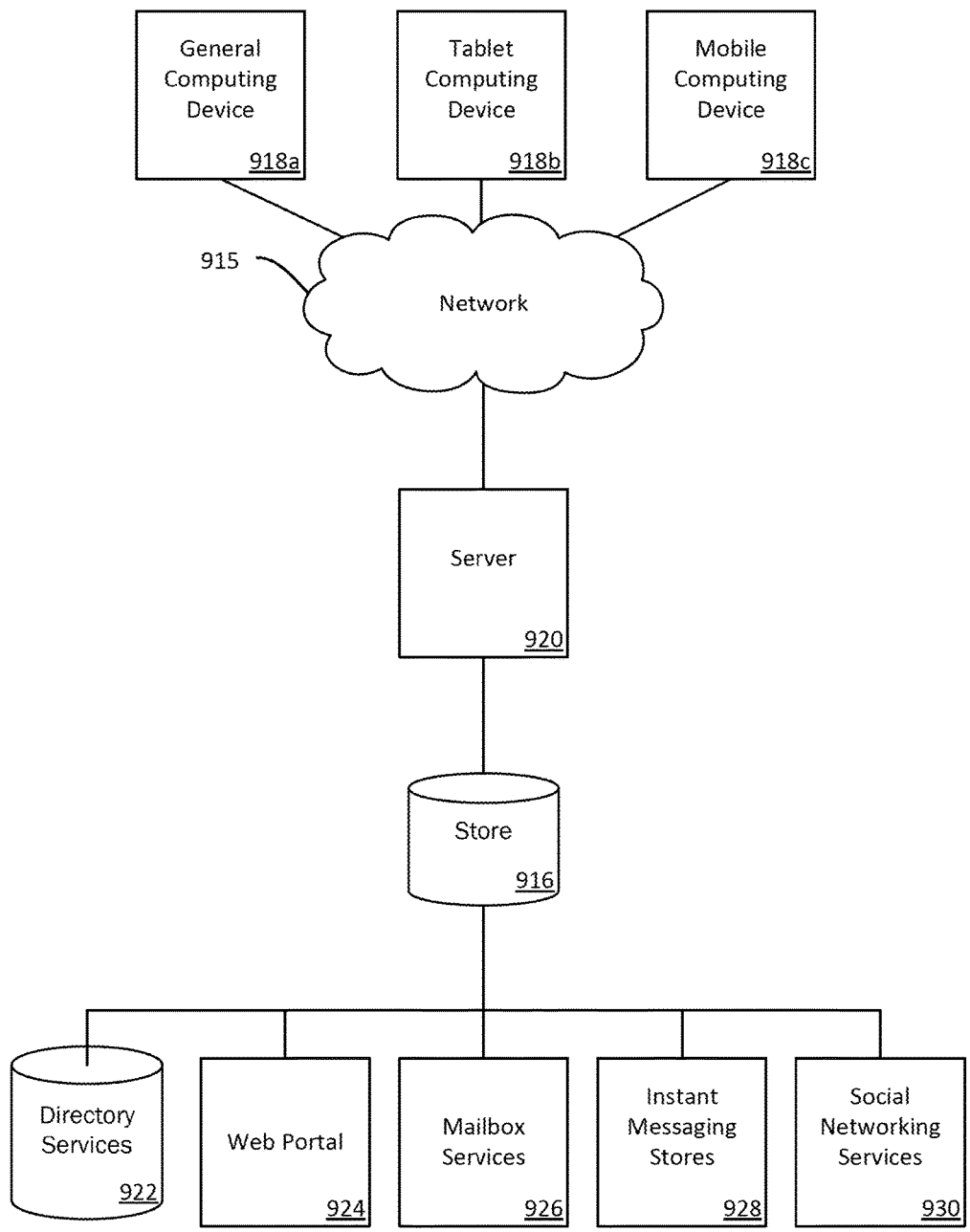
FIG. 9 is a simplified block diagram of a distributed computing system in which embodiments of the present invention may be practiced.

FIG. 9 illustrates one embodiment of the architecture of a system for providing dialog system functionality to one or more client devices, as described above. Content developed, interacted with, or edited in association with the software applications 720 may be stored in different communication channels or other storage types. For example, various documents may be stored using a directory service 922, a web portal 924, a mailbox service 926, an instant messaging store 928, or a social networking site 930. The software applications 720 may use any of these types of systems or the like for enabling data utilization, as described herein. A server 920 may provide the software applications 720 to clients. As one example, the server 920 may be a web server providing the software applications 720 over the web. The server 920 may provide the software applications 720 over the web to clients through a network 915. By way of example, the client computing device may be implemented as the computing device 700 and embodied in a personal computer 918a, a tablet computer 918b, and/or a mobile computing device (e.g., a smart phone) 918c. Any of these embodiments of the client device 104 may obtain content from the store 916.

The description and illustration of one or more embodiments provided in this application are intended to provide a complete thorough and complete disclosure the full scope of the subject matter to those skilled in the art and not intended to limit or restrict the scope of the invention as claimed in any way. The embodiments, examples, and details provided in this application are considered sufficient to convey possession and enable those skilled in the art to practice the best mode of claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A method of automatically generating natural language patterns based on a knowledge graph, the method comprising:
    selecting a relation from a knowledge graph;
    extracting at least a first pair of words from the knowledge graph, wherein the first pair of words is connected by the relation;
    receiving a set of documents as a search result based on a first query, wherein the first query comprises at least one instruction to select documents based on the first pair of words;
    extracting, from the set of documents, at least one textual snippet based on the first query, wherein the at least one textual snippet includes at least in part the first pair of words;
    extracting a second query from a query click log, wherein the query click log comprises at least one search query against at least a part of the set of documents and at least one link to at least one document, and wherein the second query is associated with at least one link to the at least one document containing the at least one textual snippet;
    generating a first set of training patterns, wherein the first set of training patterns is based on association between the at least one textual snippet and the relation;
    generating a second set of training patterns, wherein the second set of training patterns is based on association between the second query and the relation;
    generating a third set of natural language patterns for the knowledge graph, wherein generating the set of natural language patterns further comprises selectively combining the first set of training patterns and the second set of training patterns based on at least one weight between the first set of training patterns and the second set of training patterns; and
    applying the generated third set of natural language patterns to the knowledge graph to automatically train a natural language dialog system.

2. The method of claim 1, further comprising training a relation detection model using the set of natural language patterns for the knowledge graph.

3. The method of claim 1 wherein associating the at least one textual snippet further comprises:
    retrieving all properties associated with the relation, wherein the properties comprise entities and corresponding relations;
    comparing the properties to the at least one textual snippet; and
    annotating the at least one textual snippet containing matches to entities from the properties with the corresponding relations.

4. The method of claim 1 further comprising interpolating the set of natural language patterns; and
    labeling the at least one snippet with additional relations from a set of additional relations using the relation classifier.

5. The method of claim 4 wherein the set of additional relations comprises relations with a high probability of appearing in a conversational input.

6. The method of claim 1 wherein the set of documents is on the World Wide Web.

7. The method of claim 1 wherein the relation and the pair of words form a triple.

8. A computer readable storage device containing computer executable instructions which, when executed by a computer, perform a method for training a relation detection model without supervision, the method comprising:
    selecting a relation from a knowledge graph;
    extracting at least a first pair of words from the knowledge graph, wherein the first pair of words is connected by the relation;
    receiving a set of documents as a search result based on a first query, wherein the first query comprises at least one instruction to select documents based on the first pair of words;
    extracting, from the set of documents, at least one textual snippet based on the first query, wherein the at least one textual snippet includes at least in part the first pair of words;
    extracting a second query from a query click log, wherein the query click log comprises at least one search query against at least a part of the set of documents and at least one link to at least one document, and wherein the second query is associated with at least one link to the at least one document containing the at least one textual snippet;
    generating a first set of training patterns, wherein the first set of training patterns is based on association between the at least one textual snippet and the relation;
    generating a second set of training patterns, wherein the second set of training patterns is based on association between the second query and the relation;
    generating a third set of natural language patterns for the knowledge graph, wherein generating the set of natural language patterns further comprises selectively combining the first set of training patterns and the second set of training patterns based on at least one weight between the first set of training patterns and the second set of training patterns; and
    applying the generated third set of natural language patterns to the knowledge graph to automatically train a natural language dialog system.

9. The computer readable storage device of claim 8 wherein associating the at least one textual snippet further comprises:
    selecting the smallest sequence of constituent elements in the at least one textual snippet that contains both words from the pair as the set of natural language patterns; and
    replacing the both words in the set of natural language patterns with tokens from the knowledge graph corresponding to each of both words.

10. The computer readable storage device of claim 9 wherein the method further comprises associating a pair of words from the set of natural language patterns with additional relations when the pair of words corresponds to more than one relation.

11. A system comprising at least one processor in electronic communication with a computer readable storage device, the computer readable storage device storing instructions that, when executed, are capable of performing a method, the method comprising:

selecting a relation from a knowledge graph;

extracting at least a first pair of words from the knowledge graph, wherein the first pair of words is connected by the relation;

receiving a set of documents as a search result based on a first query, wherein the first query comprises at least one instruction to select documents based on the first pair of words;

extracting, from the set of documents, at least one textual snippet based on the first query, wherein the at least one textual snippet includes at least in part the first pair of words;

extracting a second query from a query click log, wherein the query click log comprises at least one search query against at least a part of the set of documents and at least one link to at least one document, and wherein the second query is associated with at least one link to the at least one document containing the at least one textual snippet;

generating a first set of training patterns, wherein the first set of training patterns is based on association between the at least one textual snippet and the relation;

generating a second set of training patterns, wherein the second set of training patterns is based on association between the second query and the relation;

generating a third set of natural language patterns for the knowledge graph, wherein generating the set of natural language patterns further comprises selectively combining the first set of training patterns and the second set of training patterns based on at least one weight between the first set of training patterns and the second set of training patterns; and applying the generated third set of natural language patterns to the knowledge graph to automatically train a natural language dialog system.

12. The system of claim 11, further comprising training a relation detection model using the set of natural language patterns for the knowledge graph.

13. The system of claim 11 wherein associating the at least one textual snippet further comprises:

retrieving all properties associated with the relation, wherein the properties comprise entities and corresponding relations;

comparing the properties to the at least one textual snippet; and annotating the at least one textual snippets containing matches to entities from the properties with the corresponding relations.

14. The system of claim 11 further comprising:

interpolating the set of natural language patterns and labeling the at least one snippets with an additional relations from a set of additional relations using the relation classifier.

15. The system of claim 14 wherein the set of additional relations comprises relations with a high probability of appearing in a conversational input.

16. The system of claim 11 wherein the relation and the pair of words form a triple.

17. A method of automatically generating natural language patterns for a knowledge graph, the method comprising:

selecting a relation from a knowledge graph;

extracting at least a first pair of words from the knowledge graph, wherein the first pair of words is connected by the relation;

receiving a set of documents as a search result based on a first query, wherein the first query comprises at least one instruction to select documents based on the first pair of words;

extracting, from the set of documents, at least one textual snippet based on the first query, wherein the at least one textual snippet includes at least in part the first pair of words; and associating the at least one textual snippet with the relation to form a set of natural language patterns for the knowledge graph.

18. The method of claim 17, further comprising:

extracting a second query from a query click log, wherein the query click log comprises at least one search query against the set of documents and at least one link to at least one document, and the second query is associated with at least one link to the at least one document containing the at least one textual snippet;

generating a first set of training patterns, wherein the first set of training patterns is based on association between the at least one textual snippet and the relation;

generating a second set of training patterns, wherein the second set of training patterns is based on association between the second query and the relation;

generating a set of natural language patterns for the knowledge graph, wherein generating the set of natural language patterns further comprises selectively combining the first set of training patterns and the second set of training patterns based on at least one weight between the first set of training patterns and the second set of training patterns; and applying the generated set of natural language patterns to the knowledge graph to automatically train a knowledge graph-based natural language dialog system.

* * * * *